(12) United States Patent
Kim

(10) Patent No.: US 10,546,126 B2
(45) Date of Patent: Jan. 28, 2020

(54) METHOD FOR DETECTING THE TAMPERING OF APPLICATION CODE AND ELECTRONIC DEVICE SUPPORTING THE SAME

(71) Applicant: Samsung Electronics Co., Ltd., Suwon-si, Gyeonggi-do (KR)

(72) Inventor: Jung Yoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 327 days.

(21) Appl. No.: 15/613,746

(22) Filed: Jun. 5, 2017

(65) Prior Publication Data

US 2017/0372067 A1 Dec. 28, 2017

(30) Foreign Application Priority Data

Jun. 28, 2016 (KR) .................. 10-2016-0080925

(51) Int. Cl.
| | |
|---|---|
| *G06F 21/56* | (2013.01) |
| *G06F 21/54* | (2013.01) |
| *H04L 9/06* | (2006.01) |
| *H04L 9/32* | (2006.01) |

(52) U.S. Cl.
CPC ............ *G06F 21/563* (2013.01); *G06F 21/54* (2013.01); *H04L 9/0643* (2013.01); *H04L 9/3242* (2013.01); *H04L 9/3247* (2013.01)

(58) Field of Classification Search
CPC ..... G06F 21/563; G06F 21/54; H04L 9/3247; H04L 9/0643
See application file for complete search history.

(56) References Cited

U.S. PATENT DOCUMENTS

| | | | |
|---|---|---|---|
| 2005/0114666 A1 | 5/2005 | Sudia | |
| 2006/0047955 A1 | 3/2006 | Prevost et al. | |
| 2009/0271637 A1* | 10/2009 | Takekawa | G06F 21/552 |
| | | | 713/189 |
| 2009/0327711 A1* | 12/2009 | Goldsmid | G06F 21/53 |
| | | | 713/165 |
| 2010/0162352 A1* | 6/2010 | Haga | G06F 21/51 |
| | | | 726/2 |
| 2011/0072266 A1* | 3/2011 | Takayama | G06F 21/445 |
| | | | 713/169 |
| 2013/0067449 A1* | 3/2013 | Sannidhanam | G06F 8/60 |
| | | | 717/170 |
| 2017/0075938 A1* | 3/2017 | Black | G06F 21/602 |
| 2018/0276374 A1* | 9/2018 | Baldwin | G06F 21/12 |

FOREIGN PATENT DOCUMENTS

KR 10-2014-0112399 A 9/2014

\* cited by examiner

*Primary Examiner* — Hee K Song
(74) *Attorney, Agent, or Firm* — Jefferson IP Law, LLP

(57) ABSTRACT

An electronic device is provided. The electronic device includes a memory configured to store an application and first unique information of the application, and at least one processor operatively connected with the memory. The at least one processor is configured to divide code of the application into a plurality of segments, select at least one segment among the plurality of segments, create second unique information in relation to the at least one segment, compare the first unique information and the second unique information, and determine whether the code of the application has been tampered with, based on a result of the comparison of the first unique information and the second unique information.

17 Claims, 7 Drawing Sheets

METHOD FOR DETECTING THE TAMPERING OF APPLICATION CODE AND ELECTRONIC DEVICE SUPPORTING THE SAME

CROSS-REFERENCE TO RELATED APPLICATION(S)

This application claims the benefit under 35 U.S.C. § 119(a) of a Korean patent application filed on Jun. 28, 2016 in the Korean Intellectual Property Office and assigned Serial number 10-2016-0080925, the entire disclosure of which is hereby incorporated by reference.

TECHNICAL FIELD

The present disclosure relates to a method for detecting tampering of application code and an electronic device supporting the same.

BACKGROUND

An electronic device such as a smartphone or the like may provide an execution environment of an application supporting various functions. For example, the electronic device may control system resources, such as a storage space of a memory and the like, such that applications supporting functions, such as a call function, a camera shooting function, a web search function, and the like, are installed and executed.

Meanwhile, to enhance security, the electronic device may include a system resource that is restricted to be accessible only by code of a trusted application. For example, the electronic device may include a secure world such as Trust Zone and may manage significant data, such as authentication information, private information, and the like, a secure module, and the like separately in the secure world.

Also, in the case where code of an application is tampered with, the electronic device may enhance security by blocking an access to the secure world. For example, in the case of an application connecting to a network, code of the application may be tampered with by a hacker over the network, and significant data may be leaked out by the tampered code, that is, malicious code. For this reason, the electronic device may determine whether application code is tampered with and may restrict an access to the secure world based on the determination result. Alternatively, if application code is tampered with through rooting or the like, a security issue that a function or authority to use is changed to be different from an original purpose of the application may occur. For this reason, the electronic device may determine whether the application code is tampered with and may restrict an access to the secure world based on the determination result.

An electronic device may determine whether tampering with code is made, with respect to the whole code area of an application according to the related art. For example, according to the related art, the electronic device may determine whether the application code is tampered with, by dividing the application code into a plurality of segments, generating unique information (e.g., a hash value) for each of the divided segments, and comparing the unique information with unique information stored in advance in a memory.

However, to determine whether the whole code area of the application is tampered with may cause a decrease in performance of the electronic device. For example, as the number of segments increases, the generation of the unique information for each of the divided segments may cause an increase in a processing time and an increase in the burden of a system resource concerned in processing.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for determining whether application code is tampered with, based on unique information of segments selected from segments of the application code and an electronic device supporting the same.

In accordance with an aspect of the present disclosure, an electronic device is provided. The electronic device includes a memory configured to store an application and first unique information of the application, and at least one processor operatively connected with the memory. The at least one processor is configured to divide code of the application into a plurality of segments, select at least one segment among the plurality of segments, create second unique information in relation to the at least one segment, compare the first unique information and the second unique information, and determine whether the code of the application has been tampered with, based on a result of the comparison of the first unique information and the second unique information.

In accordance with another aspect of the present disclosure, an electronic device is provided. The electronic device includes a memory configured to store an application and first unique information of the application, and at least one processor operatively connected with the memory. The at least one processor is configured to divide code of the application into a plurality of segments, select at least one first segment among the plurality of segments, create second unique information in relation to the at least first one segment, create third unique information in relation to the code of the application by using fourth unique information in relation to at least one second segment, which is different from the at least one first segment, from among the plurality of segments and the second unique information, verify the first unique information based on the third unique information, and determine whether the code of the application is tampered with, based on the verification result, with the fourth unique information being stored in the memory.

In accordance with another aspect of the present disclosure, a method for determining tampering of code of an application is provided. The method includes dividing the code of the application into a plurality of segments, selecting at least one first segment among the plurality of segments, creating first unique information in relation to the at least one first segment, creating second unique information in relation to the code of the application by using third unique information in relation to at least one second segment, which is different from the at least one first segment, from among the segments and the first unique information, verifying fourth unique information of an application stored in the memory based on the second unique information, and determining whether the code of the application is tampered with, based on the verification result, with the third unique information being stored in a memory.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
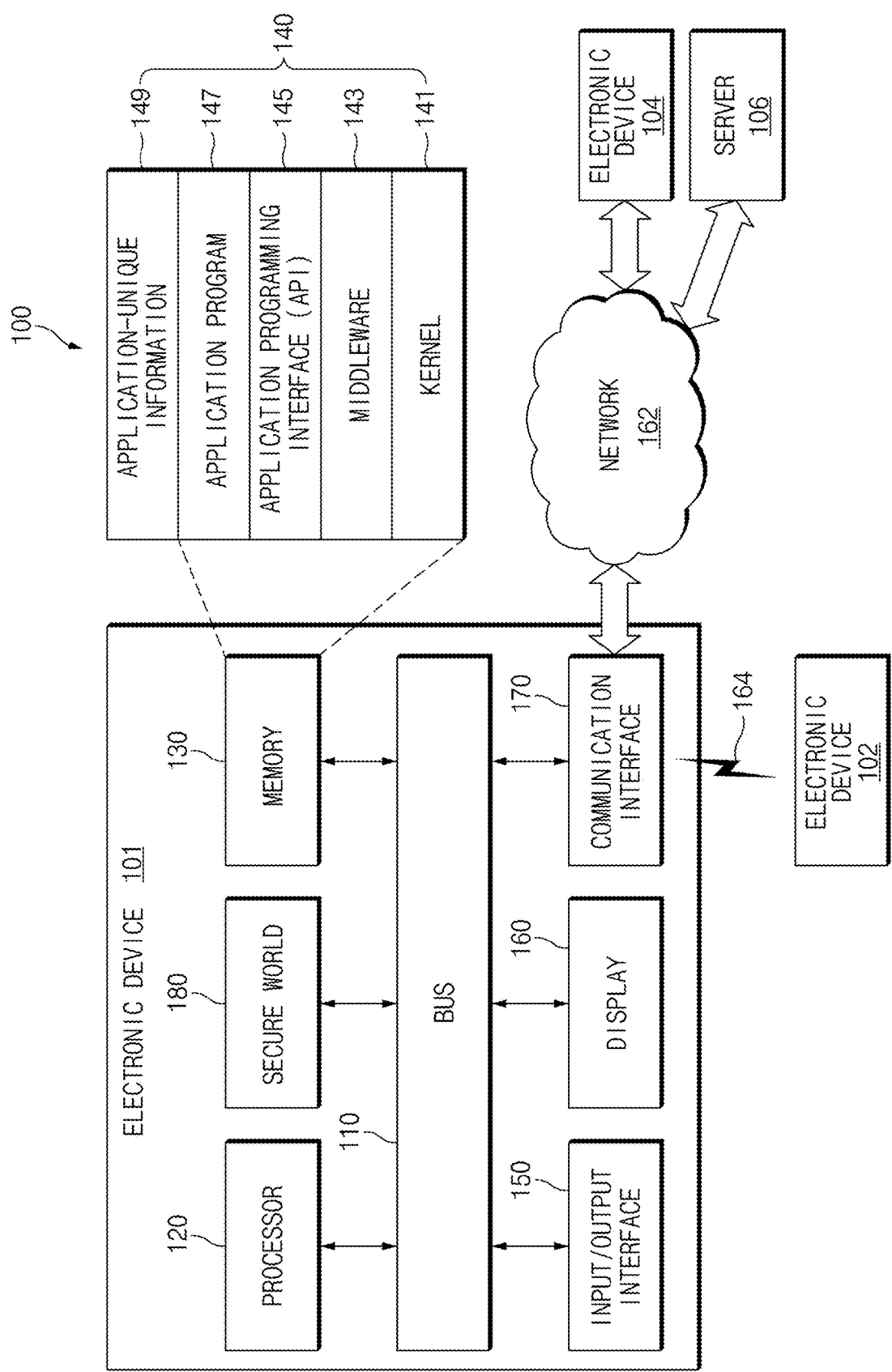
FIG. 1 is a diagram illustrating an electronic device in a network environment, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of" For example, the expression "a processor configured to perform A, B, and C" may indicate a dedicated processor (for example, an embedded processor) for performing a corresponding operation or a general-purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit)

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 is a diagram illustrating a system 100 for an electronic device in a network environment, according to an embodiment of the present disclosure.

Referring to FIG. 1, an electronic device 101 may provide an execution environment of an application program (or "application") 147 that supports a specified function. Also, the electronic device 101 may include a secure world 180 that is restricted to be accessible only by code of the application 147, when trusted, and may manage significant data, such as authentication information, private information, and the like, a secure module, and the like separately in the secure world 180. In this regard, the application 147 may include at least one code. The code may include, for example, a set of instructions associated with a function of the application 147.

According to various embodiments, in the case where the code of the application 147 is tampered with, the electronic device 101 may enhance security by blocking an access to the secure world 180. For example, the electronic device 101 may restrict the application 147, when tampered with, so as not to write or read data in or from the secure world 180. In any embodiment, the electronic device 101 may restrict execution of the application 147, when tampered with.

Referring to FIG. 1, the electronic device 101 for performing above-described function may be interconnected with an external device (e.g., a first external electronic device 102, a second external electronic device 104, or a server 106) over a network 162 or a short-range communication 164. The electronic device 101 may include a bus 110, a processor 120, a memory 130, an input/output (I/O) interface 150, a display 160, and a communication interface 170. In any embodiment, the electronic device 101 may not include at least one of the above-described components or may further include any other component(s).

The bus 110 may include a circuit for connecting the above-mentioned elements 110 to 180 to each other and transferring communications (e.g., control messages and/or data) among the above-mentioned elements.

The processor 120 may include at least one of a central processing unit (CPU), an application processor (AP), or a communication processor (CP). The processor 120 may perform data processing or an operation related to communication and/or control of at least one of the other elements of the electronic device 101.

According to various embodiments, the processor 120 may control installation and execution of the application 147. The processor 120 may install the application 147, which is acquired from the external device (e.g., the first external electronic device 102, the second external electronic device 104, or the server 106) connected based on the communication interface 170, in the memory 130. The processor 120 may execute the application 147 installed in the memory 130.

According to various embodiments, the processor 120 may detect the tampering with code of the application 147. For example, the processor 120 may determine whether the code of the application 147 is tampered with, by creating unique information of the code of the application 147 and comparing the created unique information with application-unique information 149 stored in advance in the memory 130.

In more detail, first, the processor 120 may divide the code of the application 147 into a plurality of segments. A segment may refer to a unit by which the code of the application 147 is loaded onto or stored in the memory 130. The processor 120 may select some of the divided segments and may create unique information of the selected segments.

The unique information may include, for example, at least one of a hash value of each segment extracted by using a hash function (e.g., secure hash algorithm(SHA)-256 or the like), a ciphertext of each segment extracted by using an encryption algorithm, and a calculation value of each segment extracted by using a bit operation (e.g., an XOR operation or the like). The processor 120 may compare the created unique information with the application-unique information 149 stored in advance in the memory 130. In the case where the created unique information is different from the application-unique information 149, the processor 120 may determine that the code of the application 147 is tampered with.

In any embodiment, the processor 120 may create unique information of a selected segment, and the processor 120 may create unique information of the whole code of the application 147 by using unique information of another segment, which is stored in advance in the memory 130, and the created unique information. The processor 120 may determine whether the tampering with the code of the application 147 is made, by comparing the created unique information of the whole code of the application 147 with the application-unique information 149 stored in advance in the memory 130.

In this regard, the application-unique information 149 may include at least one of unique information of the whole code of the application 147 and unique information of some of divided segments of the code of the application 147. For example, the application-unique information 149 may include unique information of the remaining segments other than a segment (e.g., a segment of significant code), which has to be necessarily selected by the processor 120, from among the divided segments of the code of the application 147. As another example, the application-unique information 149 may include tamper-proof code (e.g., a digital signature value, a hash-based message authentication code (HMAC), or the like) generated based on the unique information of the whole code of the application 147. In this case, the processor 120 may detect the tampering with the code of the application 147 by using the tamper-proof code.

According to various embodiments, the processor 120 may differently specify the number of segments to be selected from the divided segments of the code of the application 147 based on a security level of the application 147. For example, the processor 120 may set the application 147 (e.g., a secure application or the like) of a high security level such that a relatively large number of segments are selected compared with the application 147 of a low security level. In any embodiment, the processor 120 may differently specify the number of segments to be selected, based on performance of the electronic device 101, a size of the code of the application 147, or the like.

According to various embodiments, when the processor 120 selects some of the divided segments, the processor 120 may select segments, which are adjacent to each other on the code of the application 147, as a group. For example, in the case where the code of the application 147 is divided into a first segment, a second segment, a third segment, and a fourth segment in order, the processor 120 may select the first segment and the second segment, the third segment and the fourth segment, or the like that are adjacent to each other.

According to various embodiments, the processor 120 may create unique information in units of a page, not in units of a segment. A page may refer to a unit by which data are loaded onto or stored in the secure world 180. For example, the page may have a size that is applied when the memory 130 external to the secure world 180 is accessed by the secure world 180. In the case of the electronic device 101 in which the processor 120 creates unique information in units of a page, the application-unique information 149 may also include data created in units of a page.

According to various embodiments, the processor 120 may restrict execution of the application 147, when tampered with. For example, the processor 120 may not execute the application 147, when tampered with. As another example, the electronic device 101 may restrict the tampered application 147 so as not to write or read data in or from the secure world 180. Also, in the case where the code of the application 147 is tampered with, the processor 120 may output a display object (e.g., a pop-up) indicating the tampering with the code of the application 147 through the display 160. In any embodiment, the processor 120 may output voice information indicating the tampering with the code of the application 147 through a voice output device included in the I/O interface 150.

The memory 130 may include a volatile memory and/or a nonvolatile memory. The memory 130 may store instructions or data related to at least one of the other elements of the electronic device 101. According to an embodiment of the present disclosure, the memory 130 may store software and/or a program 140. The program 140 may include, for example, a kernel 141, a middleware 143, an application programming interface (API) 145, and/or an application program (or an application) 147. At least a portion of the kernel 141, the middleware 143, or the API 145 may be referred to as an operating system (OS).

The kernel 141 may control or manage system resources (e.g., the bus 110, the processor 120, the memory 130, or the like) used to perform operations or functions of other programs (e.g., the middleware 143, the API 145, or the application 147). Furthermore, the kernel 141 may provide an interface for allowing the middleware 143, the API 145, or the application 147 to access individual elements of the electronic device 101 in order to control or manage the system resources.

The middleware 143 may serve as an intermediary so that the API 145 or the application 147 communicates and exchanges data with the kernel 141.

Furthermore, the middleware 143 may handle one or more task requests received from the application 147 according to a priority order. For example, the middleware 143 may assign at least one application 147 a priority for using the system resources (e.g., the bus 110, the processor 120, the memory 130, or the like) of the electronic device 101. For example, the middleware 143 may handle the one or more task requests according to the priority assigned to the at least one application, thereby performing scheduling or load balancing with respect to the one or more task requests.

The API 145, which is an interface for allowing the application 147 to control a function provided by the kernel 141 or the middleware 143, may include, for example, at least one interface or function (e.g., instructions) for file control, window control, image processing, character control, or the like.

The application 147 may include sets of programs (or instructions) which are defined to perform a designated function. The processor 120 may load the instructions of the application 147 from the memory 130 and may execute the corresponding instructions according to a program routine. The instructions may include machine language codes generated by compilers and high-level language codes that can be executed by computers using interpreters. The application 147 may be installed in the memory 130 in various ways. For example, the application 147 may include a preloaded application or a third-party application which may be downloaded from an external device (e.g., the first external electronic device 102, the second external electronic device 104, or the server 106).

The application-unique information 149 may include information that is referenced upon detecting the tampering of the code of the application 147. According to an embodiment, the application-unique information 149 may be in advance stored in the memory 130 after being created in the process of manufacturing the electronic device 101 or may be stored in the memory 130 after being created while the electronic device 101 is used. For example, the application-unique information 149 corresponding to a preload application may be in advance stored in the memory 130 after being created in the process of manufacturing the electronic device 101, and the application-unique information 149 corresponding to a third-party application may be stored in the memory 130 after being created when the third-party application is installed.

The I/O interface 150 may serve to transfer an instruction or data input from a user or another external device to (an)other element(s) of the electronic device 101. Furthermore, the I/O interface 150 may output instructions or data received from (an)other element(s) of the electronic device 101 to the user or another external device.

According to various embodiments, the I/O interface 150 may include a voice output device such as a speaker or the like. In the case where the code of the application 147 is tampered with, under control of the processor 120, the I/O interface 150 may output voice information indicating the tampering with the code of the application 147.

The display 160 may include, for example, a liquid crystal display (LCD), a light-emitting diode (LED) display, an organic light-emitting diode (OLED) display, a microelectromechanical systems (MEMS) display, or an electronic paper display. The display 160 may present various content (e.g., a text, an image, a video, an icon, a symbol, or the like) to the user. The display 160 may include a touch screen, and may receive a touch, gesture, proximity or hovering input from an electronic pen or a part of a body of the user.

According to various embodiments, in the case where the code of the application 147 is tampered with, under control of the processor 120, the display 160 may output a display object (e.g., a pop-up) indicating the tampering with the code of the application 147.

The communication interface 170 may set communications between the electronic device 101 and an external device (e.g., a first external electronic device 102, a second external electronic device 104, or a server 106). For example, the communication interface 170 may be connected to a network 162 via wireless communications or wired communications so as to communicate with the external device (e.g., the second external electronic device 104 or the server 106).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communication 164. The short-range communications may include at least one of Wi-Fi, Bluetooth (BT), near field communication (NFC), magnetic stripe transmission (MST), or GNSS.

The MST may generate pulses according to transmission data and the pulses may generate electromagnetic signals. The electronic device 101 may transmit the electromagnetic signals to a reader device such as a point of sales (POS) (point of sales) device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 162 may include at least one of telecommunications networks, for example, a computer network (e.g., local area network (LAN) or wide area network (WAN)), the Internet, or a telephone network.

The types of the first external electronic device 102 and the second external electronic device 104 may be the same as or different from the type of the electronic device 101. According to an embodiment of the present disclosure, the server 106 may include a group of one or more servers. A portion or all of operations performed in the electronic device 101 may be performed in one or more other electronic devices (e.g., the first external electronic device 102, the second external electronic device 104, or the server 106). When the electronic device 101 should perform a certain function or service automatically or in response to a request, the electronic device 101 may request at least a portion of functions related to the function or service from another device (e.g., the first external electronic device 102, the second external electronic device 104, or the server 106) instead of or in addition to performing the function or service for itself. The other electronic device (e.g., the first external electronic device 102, the second external electronic device 104, or the server 106) may perform the requested function or additional function, and may transfer a result of the performance to the electronic device 101. The electronic device 101 may use a received result itself or additionally process the received result to provide the requested function or service. To this end, for example, a cloud computing technology, a distributed computing technology, or a client-server computing technology may be used.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 2:
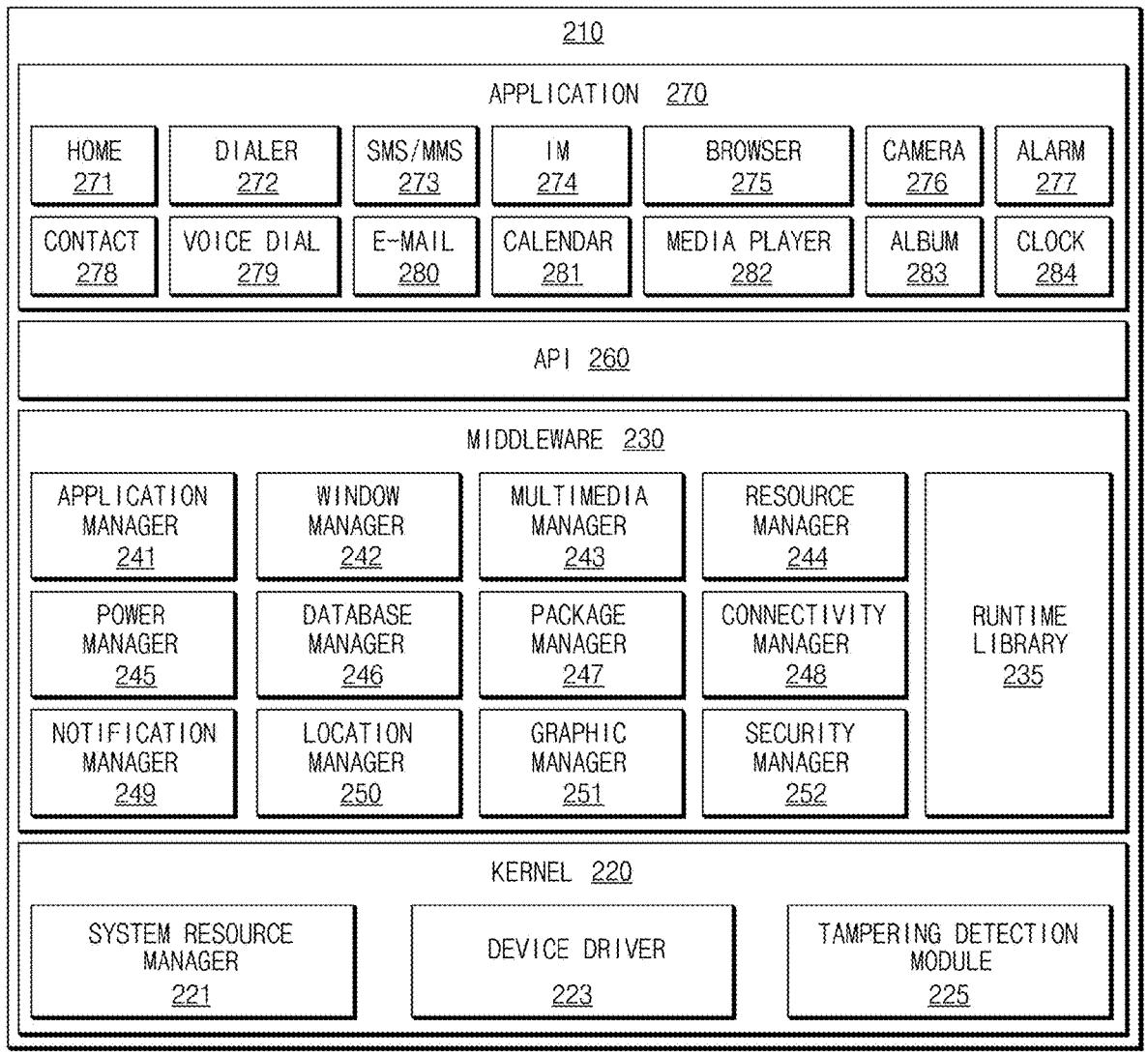
FIG. 2 is a block diagram of a program module, according to an embodiment of the present disclosure.

FIG. 2 is a block diagram of a program module, according to an embodiment of the present disclosure.

Referring to FIG. 2, according to an embodiment, a program module 210 (e.g., the program 140) may include an operating system (OS) for controlling a resource related to an electronic device (e.g., the electronic device 101) and/or various applications (e.g., the application 147) running on the OS. The OS may be, for example, Android™, iOS™, Windows™, Symbian™, Tizen™, or the like.

The program module 210 may include a kernel 220, a middleware 230, an API 260, and/or an application 270. At least a part of the program module 210 may be preloaded on an electronic device or may be downloaded from an external electronic device (e.g., the first external electronic device 102, the second external electronic device 104, or the server 106).

A kernel 220 (e.g., the kernel 141) may include, for example, a system resource manager 221, a device driver 223, and a tampering detection module 225. The system resource manager 221 may perform control, allocation, or retrieval of system resources. According to an embodiment, the system resource manager 221 may include a process managing part, a memory managing part, or a file system managing part.

The device driver 223 may include, for example, a display driver, a camera driver, a Bluetooth driver, a shared memory driver, a USB driver, a keypad driver, a Wi-Fi driver, an audio driver, or an inter-process communication (IPC) driver.

The tampering detection module 225 may detect the tampering with code of an application 270. The tampering detection module 225 may divide the code of the application 270 into a plurality of segments. According to an embodiment, the tampering detection module 225 may divide segments into at least one page. Also, the tampering detection module 225 may create unique information in relation to the divided segment or page. For example, the tampering detection module 225 may create at least one of a hash value, a ciphertext, and a calculation value of the divided segment or page. The tampering detection module 225 may compare the created unique information with application-unique information (e.g., the application-unique information 149) stored in a memory (e.g., the memory 130) and may determine whether the code of the application 270 is tampered with, based on the comparison result.

According to various embodiments, the tampering detection module 225 may be included in a middleware 230. Alternatively, the tampering detection module 225 may be included in a secure world (e.g., the secure world 180), not in the memory (e.g., the memory 130).

The middleware 230, for example, may provide a function that the applications 270 require in common, or may provide various functions to the applications 270 through the API 260 so that the applications 270 may efficiently use limited system resources in the electronic device. According to an embodiment of the present disclosure, the middleware 230 (e.g., the middleware 143) may include at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The runtime library 235 may include, for example, a library module that a complier uses to add a new function through a programming language while the application 270 is running. The runtime library 235 may perform a function for input/output management, memory management, or an arithmetic function.

The application manager 241 may mange, for example, a life cycle of at least one of the applications 270. The window manager 242 may manage a GUI resource used in a screen. The multimedia manager 243 may recognize a format required for playing various media files and may encode or decode a media file using a codec matched to the format. The resource manager 244 may manage a resource such as a source code, a memory, or a storage space of at least one of the applications 270.

The power manager 245, for example, may operate together with a basic input/output system (BIOS) to manage a battery or power and may provide power information required for operating the electronic device. The database manager 246 may generate, search, or modify a database to be used in at least one of the applications 270. The package manager 247 may manage installation or update of an application distributed in a package file format.

The connectivity manger 248 may manage wireless connection of Wi-Fi, Bluetooth, or the like. The notification manager 249 may display or notify an event such as message arrival, appointments, and proximity alerts in such a manner as not to disturb a user. The location manager 250 may manage location information of the electronic device. The graphic manager 251 may manage a graphic effect to be provided to a user or a user interface related thereto. The security manager 252 may provide various security functions required for system security or user authentication. According to an embodiment of the present disclosure, in the case in which an electronic device (e.g., the electronic device 101) includes a phone function, the middleware 230 may further include a telephony manager for managing a voice or video call function of the electronic device.

The middleware 230 may include a middleware module for forming a combination of various functions of the above-mentioned elements. The middleware 230 may provide a module specialized for each type of an operating system to provide differentiated functions. Furthermore, the middleware 230 may delete a part of existing elements or may add new elements dynamically.

The API 260 (e.g., the API 145) which is, for example, a set of API programming functions may be provided in different configurations according to an operating system. For example, in the case of Android™ or iOS™, one API set may be provided for each platform, and, in the case of Tizen™, at least two API sets may be provided for each platform.

The application 270 (e.g., the application program 147), for example, may include at least one application capable of performing functions such as a home 271, a dialer 272, a short message service (SMS)/multimedia message service (MMS) 273, an instant message (IM) 274, a browser 275, a camera 276, an alarm 277, a contact 278, a voice dial 279, an e-mail 280, a calendar 281, a media player 282, an album 283, a clock 284, health care (e.g., measure an exercise amount or blood sugar), or environmental information provision (e.g., provide air pressure, humidity, or temperature information).

According to an embodiment of the present disclosure, the application 270 may include an information exchange application for supporting information exchange between the electronic device (e.g., the electronic device 101) and an external electronic device (e.g., the first external electronic device 102 or the second external electronic device 104). The information exchange application may include, for example, a notification relay application for relaying specific information to the external electronic device or a device management application for managing the external electronic device.

For example, the notification relay application may have a function for relaying, to an external electronic device (e.g., the first external electronic device 102 or the second external electronic device 104), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first external electronic device 102 or the second external electronic device 104) communicating with the electronic device, an application running in the external electronic device, or a service (e.g., a call service, a message service, or the like) provided from the external electronic device.

According to an embodiment of the present disclosure, the application 270 may include a specified application (e.g., a healthcare application of a mobile medical device) according to an attribute of the external electronic device (e.g., the first external electronic device 102 or the second external electronic device 104). The application 270 may include an application received from an external electronic device (e.g., the first external electronic device 102 or the second external electronic device 104). The application 270 may include a preloaded application or a third-party application downloadable from a server. The names of the elements of the program module 210 illustrated may vary with the type of an operating system.

According to various embodiments of the present disclosure, at least a part of the program module 210 may be implemented with software, firmware, hardware, or a combination thereof. At least a part of the program module 210, for example, may be implemented (e.g., executed) by a processor (e.g., the processor 120). At least a part of the program module 210 may include, for example, a module, a program, a routine, sets of instructions, or a process for performing at least one function.

Figure 3:
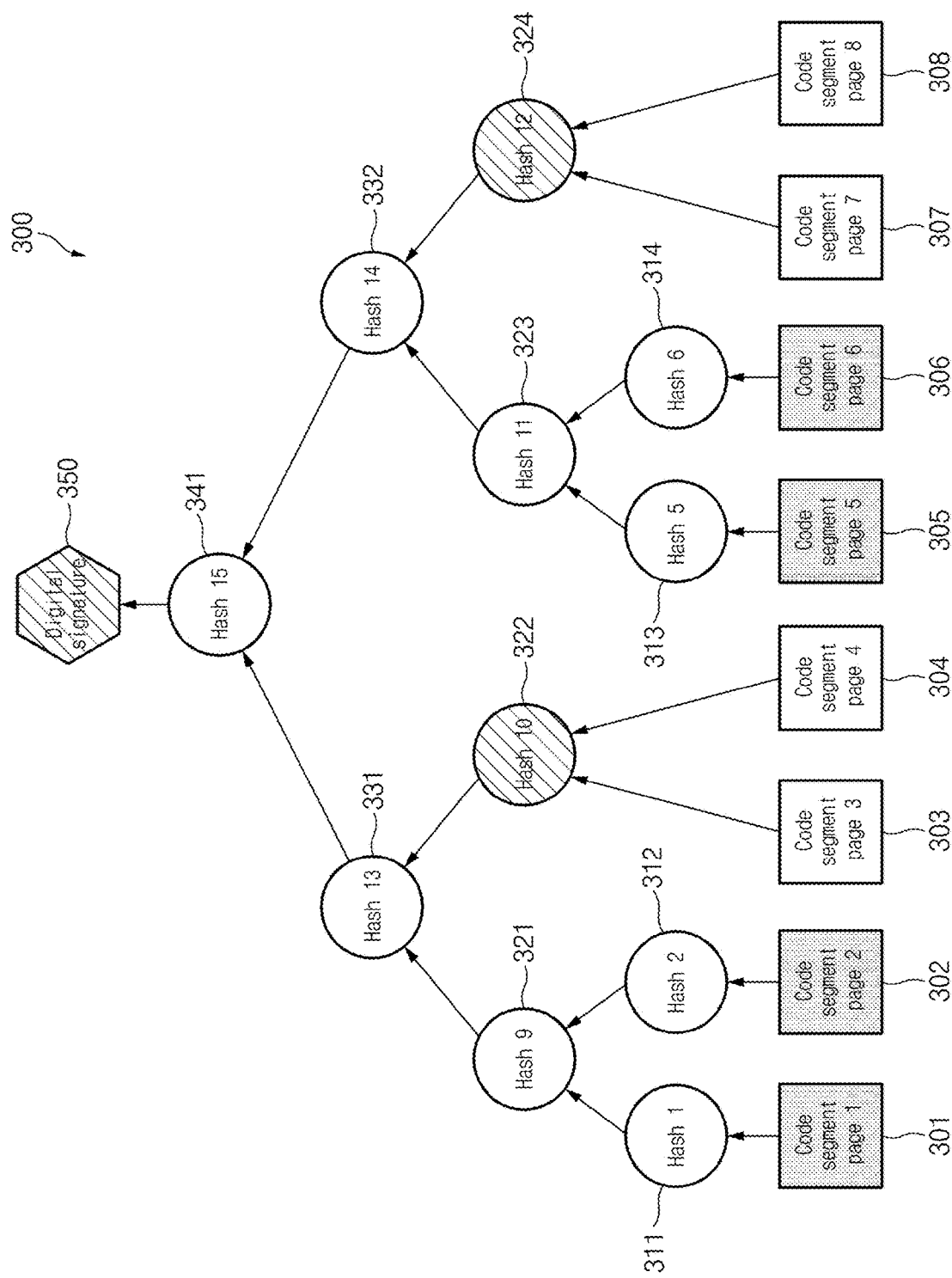
FIG. 3 is a diagram for describing a method for detecting the tampering by using unique information of application code, according to an embodiment of the present disclosure.

FIG. 3 is a diagram for describing a method for detecting the tampering by using unique information of application code, according to an embodiment of the present disclosure.

Referring to FIG. 3, according to various embodiments, code of an application 300 may be divided into a plurality of segments. Alternatively, as illustrated in FIG. 3, segments may be divided into a plurality of pages. Since processing of a segment division manner is the same as or similar to processing of a page division manner, for ease of description, the page division manner will be described below with reference to FIG. 3. In FIG. 3, the code of the application 300 is illustrated as being divided into a first page 301, a second page 302, a third page 303, a fourth page 304, a fifth page 305, a sixth page 306, a seventh page 307, and an eighth page 308. However, the number of divided pages is not limited thereto.

A processor (e.g., the processor 120) may select some of the divided pages. According to an embodiment, the processor may differently specify the number of pages to be selected, based on at least one of a security level of the application 300, performance of an electronic device (e.g., the electronic device 101), and a size of the whole code of the application 300. Also, the processor may first select pages, which are to be authenticated necessarily, from among the divided pages, and the remaining pages may be randomly selected. As another example, the processor may first select a page, which corresponds to significant code, for example, security related code, from among the divided pages based on contents of the code of the application 300.

According to various embodiments, the processor may select pages, which are adjacent to each other on the code of the application 300 (e.g., on a binary tree in which each page is a leaf node), from among the divided pages as a group when selecting pages. For example, the processor may select pages of the code, which are associated with each other, as a group. An embodiment is illustrated in FIG. 3 as the processor selects the first page 301 and the second page 302 as a first group and selects the fifth page 305 and the sixth page 306 as a second group.

The processor may create unique information of the selected pages. The unique information may include, for example, at least one of a hash value of each page extracted by using a hash function, a ciphertext of each page extracted by using an encryption algorithm, and a calculation value of each page extracted by using a bit operation. Below, the case where a hash value is extracted as unique information will be described. An embodiment is illustrated in FIG. 3 as the processor extracts a first hash value 311 of the first page 301, a second hash value 312 of the second page 312, a fifth hash value 313 of the fifth page 305, and a sixth hash value 314 of the sixth page 306.

According to various embodiments, the processor may compare the extracted hash values and hash values (e.g., application-unique information 149) stored in advance in a memory (e.g., the memory 130). If an extracted hash value is different from a hash value stored in advance, the processor may determine that the code of the application 300 is tampered with.

According to various embodiments, the processor may create unique information of the whole code of the application 300. For example, as illustrated in FIG. 3, the processor may create a final hash value 341 of the whole code of the application 300 by using the hash values of the selected pages and hash values (e.g., the application-unique information 149), which are stored in advance in the memory (e.g., the memory 130), of the remaining pages. As illustrated in FIG. 3, the processor may create the final hash value 341 in a way to create a hash value corresponding to an upper node by using hash values corresponding to lower nodes adjacent on the binary tree. For example, the processor may create a ninth hash value 321 by using the first hash value 311 and the second hash value 312 respectively associated with the first page 301 and the second page 302 that are selected as the first group and may create an eleventh hash value 323 by using the fifth hash value 313 and the sixth hash value 314 respectively associated with the fifth page 305 and the sixth page 306 that are selected as the second group. Also, the processor may create a thirteenth hash value 331 by using the ninth hash value 321 and a tenth hash value 322 stored in advance in the memory and may create a fourteenth hash value 332 by using the eleventh hash value 323 and a twelfth hash value 324 stored in advance in the memory. The processor may create the final hash value 341 by using the thirteenth hash value 331 and the fourteenth hash value 332.

Afterwards, the processor may compare the final hash value 341 with a final hash value (e.g., the application-unique information 149) stored in advance in the memory, if the final hash value 341 is different from the final hash value stored in the memory, the processor may determine that the code of the application 300 is tampered with. In any embodiment, the processor may verify a digital signature value 350 stored in advance in a memory based on the final hash value 341 and may determine whether the code of the application 300 is tampered with, based on the verification result.

As described above, the processor may use unique information stored in advance in the memory without creating unique information (e.g., a third hash value, a fourth hash value, a seventh hash value, and an eighth hash value) of the third page 303, the fourth page 304, the seventh page 307, and the eighth page 308 that are not selected, thereby decreasing a processing time and preventing an increase in burden of a system resource involved in processing.

Figure 4:
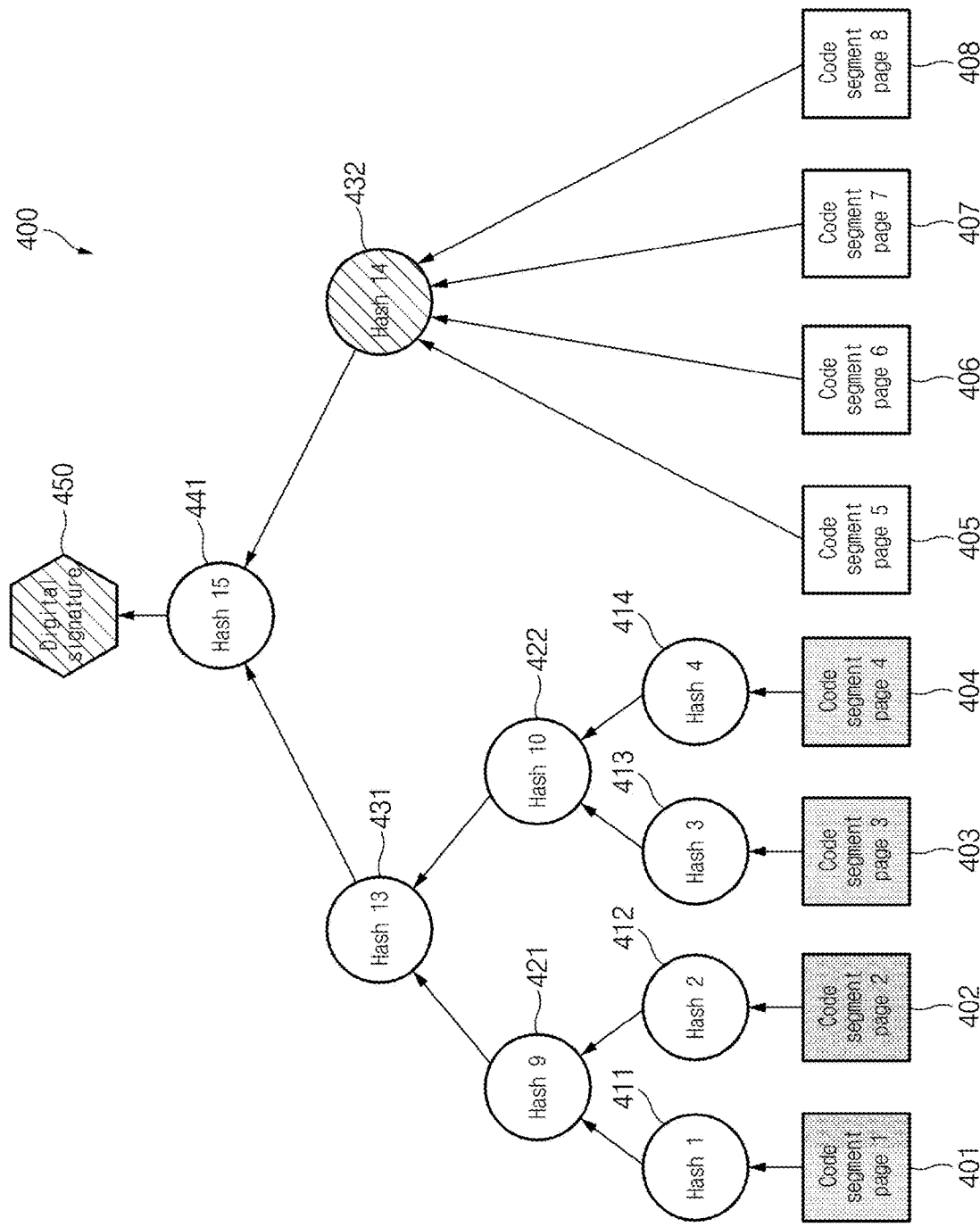
FIG. 4 is a diagram for describing a method for selecting pages based on an authentication ratio, according to an embodiment of the present disclosure.

FIG. 4 is a diagram for describing a method for selecting pages based on an authentication ratio, according to an embodiment of the present disclosure.

Referring to FIG. 4, according to various embodiments, a processor (e.g., the processor 120) may differently select pages based on an authentication ratio. The authentication ratio may indicate a ratio of the number of selected pages to the number of divided pages. For example, in FIGS. 3 and 4, since the number of divided pages is "8" and the number of selected pages is "4", the authentication ratio may correspond to 50%. The authentication ratio may be specified based on at least one of a security level of an application 400, performance of an electronic device (e.g., the electronic device 101), and a size of the whole code of the application 400.

A processor may differently specify the number of pages to be selected, based on an authentication ratio that is specified for each application 400. For example, in the case where the number of pages of the code of the application 400 is "n" and the authentication ratio is m %, the processor may select (n*m/100) pages.

According to various embodiments, the processor may differently specify the number of unique information of pages, which are to be stored in advance in a memory (e.g., the memory 130), based on a minimum authentication ratio specified for each application 400. The minimum authentication ratio may indicate a ratio of the number of pages, which are adjacent to each other, from among selected pages to the number of divided pages. For example, in FIG. 3, since the number of divided pages is "8" and the number of pages, which are adjacent to each other, from among selected pages is "2", the minimum authentication ratio may correspond to 25%. Also, in FIG. 4, since the number of divided pages is "8" and the number of pages, which are adjacent to each other, from among selected pages is "4", the minimum authentication ratio may correspond to 50%. The processor may store a small amount of unique information of pages in a memory as the minimum authentication ratio becomes higher. For example, in FIG. 3, the minimum authentication ratio is 25%, and the number of hash values stored in advance in a memory is "2"; in FIG. 4, the minimum authentication ratio is 50%, and the number of hash values stored in advance in a memory is "1".

An embodiment is illustrated in FIG. 4 as the processor selects and groups a first page 401, a second page 402, a third page 403, and a fourth page 404 that are adjacent to each other. The processor may create a first hash value 411 of the first page 401, a second hash value 412 of the second page 402, a third hash value 413 of the third page 403, and a fourth hash value 414 of the fourth page 404. Also, the processor may create a ninth hash value 421 by using the first hash value 411 and the second hash value 412, may create a tenth hash value 422 by using the third hash value 413 and the fourth hash value 414, and may create a thirteenth hash value 431 by using the ninth hash value 421 and the tenth hash value 422. Finally, the processor may create a final hash value 441 by using the thirteenth hash value 431 and a fourteenth hash value 432 stored in advance in the memory. Also, the processor may verify a digital signature value 450 stored in advance in the memory based on the final hash value 441 and may determine whether the code of the application 400 is tampered with, based on the verification result.

As described above, since the processor selects adjacent pages that correspond to 50% of adjacent pages, the processor may not create unique information (e.g., a fifth hash value, a sixth hash value, a seventh hash value, and an eighth hash value) of unselected pages (e.g., a fifth page 405, a sixth page 406, a seventh page 407, and an eighth page 408) corresponding to the remaining 50% and may not create unique information (e.g., an eleventh hash value and a twelfth hash value) corresponding to an upper node.

As described above, according to various embodiments, an electronic device may include a memory configured to store an application and first unique information of the application, and a processor operatively connected with the memory. The processor may be configured to divide code of the application into a plurality of segments, select at least one segment of the segments, create second unique information in relation to the at least one segment, compare the first unique information and the second unique information, and determine whether the code of the application is tampered with, based on the comparison result.

According to various embodiments, the first unique information may include unique information in relation to the at least one segment created in a process of manufacturing the electronic device or upon installing the application.

According to various embodiments, the first unique information may include at least one of a hash value of the at least one segment extracted by using a hash function, a ciphertext of the at least one segment extracted by using an encryption algorithm, and a calculation value of the at least one segment extracted by using a bit operation.

According to various embodiments, the processor may be configured to divide the code of the application into the segments each having a specified size, specify the number of the segments divided and divide the code of the application into the segments to correspond to the specified number, or divide the code of the application into the segments randomly.

According to various embodiments, the processor may be configured to select the at least one segment based on at least one of a security level of the application, performance of the electronic device, and a size of the whole code of the application.

According to various embodiments, an electronic device may include a memory configured to store an application and first unique information of the application, and a processor operatively connected with the memory. The processor may be configured to divide code of the application into a plurality of segments, select at least one first segment of the segments, create second unique information in relation to the at least first one segment, create third unique information in relation to the whole code of the application by using fourth unique information in relation to at least one second segment, which is different from the at least one first segment, from among the segments and the second unique information, wherein the fourth unique information being stored in the memory, verify the first unique information based on the third unique information, and determine whether the code of the application is tampered with, based on the verification result.

According to various embodiments, the first unique information may include tamper-proof code created based on unique information in relation to the whole code of the application in a process of manufacturing the electronic device or upon installing the application.

According to various embodiments, the tamper-proof code may include at least one of a digital signature value and hash-based message authentication code (HMAC).

According to various embodiments, each of the second unique information, the third unique information, and the fourth unique information may include at least one of a hash value extracted by using a hash function, a ciphertext extracted by using an encryption algorithm, and a calculation value extracted by using a bit operation.

According to various embodiments, the processor may be configured to specify the number of the at least one first segment selected based on at least one of a security level of the application, performance of the electronic device, and a size of the whole code of the application.

According to various embodiments, the processor may be configured to select a plurality of segments adjacent to each other on the code of the application as at least one group upon selecting the at least one first segment.

According to various embodiments, the processor may be configured to first select, based on contents of the code of the application, at least one segment, which corresponds to significant code, from among the segments as a part of the at least one first segment, and randomly select at least another segment, which is different from the at least one segment, from among the segments as another part of the at least one first segment.

Figure 5:
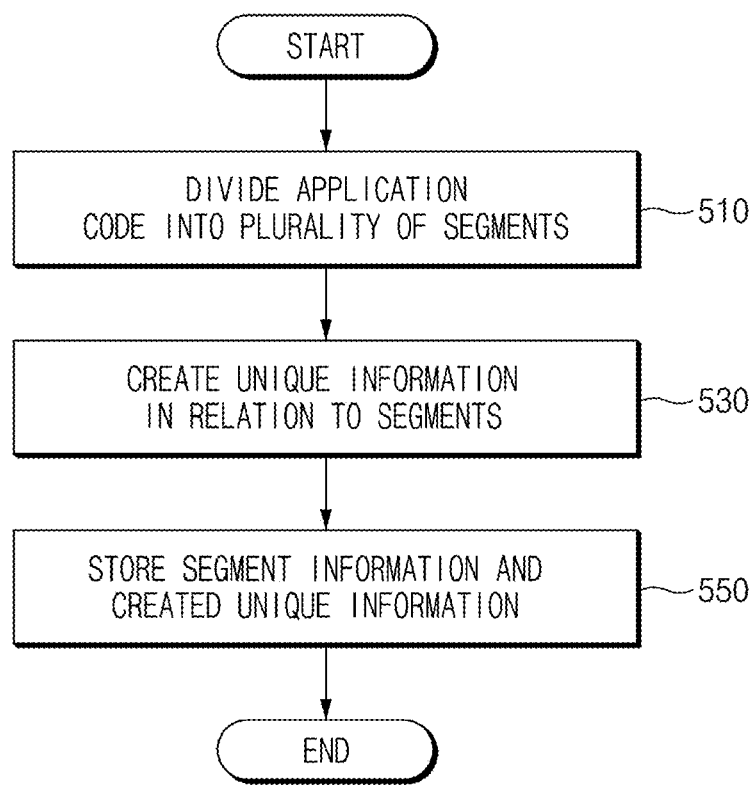
FIG. 5 is a diagram illustrating an operating method of an electronic device associated with acquiring unique information of application code, according to an embodiment of the present disclosure.

FIG. 5 is a diagram illustrating an operating method of an electronic device associated with acquiring unique information of application code, according to an embodiment of the present disclosure.

Referring to FIG. 5, in operation 510, an electronic device (e.g., the electronic device 101) may divide code of an application (e.g., the application program 147) into a plurality of segments. According to an embodiment, the electronic device may divide segments into at least one page.

According to an embodiment, the electronic device may divide the code of the application in units of a segment (or page) of a specified size. In any embodiment, the electronic device may specify the number of segments (or pages) to be divided and may divide the code of the application to correspond to the specified number. Alternatively, the electronic device may randomly divide the code of the application.

In operation 530, the electronic device may create unique information (e.g., the application-unique information 149) in relation to the divided segments (or pages). The unique information may include, for example, at least one of a hash value of each segment (or page) extracted by using a hash function, a ciphertext of each segment (or page) extracted by using an encryption algorithm, and a calculation value of each segment (or page) extracted by using a bit operation.

In operation 550, the electronic device may store information of the divided segments (or pages) and the created unique information in a memory (e.g., the memory 130). According to an embodiment, the electronic device may store unique information of each segment (or page) in the memory together with the number of the divided segments (or pages), a node number of a segment (or page) on a binary tree in which each of the divided segments (or pages) is a leaf node. In any embodiment, the electronic device may further store tamper-proof code (e.g., a digital signature value, HMAC, or the like) that is created based on unique information of the whole code of the application.

According to an embodiment, the electronic device may perform operation 510 to operation 550 on a preload application in the process of manufacturing the electronic device. As another example, the electronic device may perform operation 510 to operation 550 on a third-party application when installing the third-party application.

Figure 6:
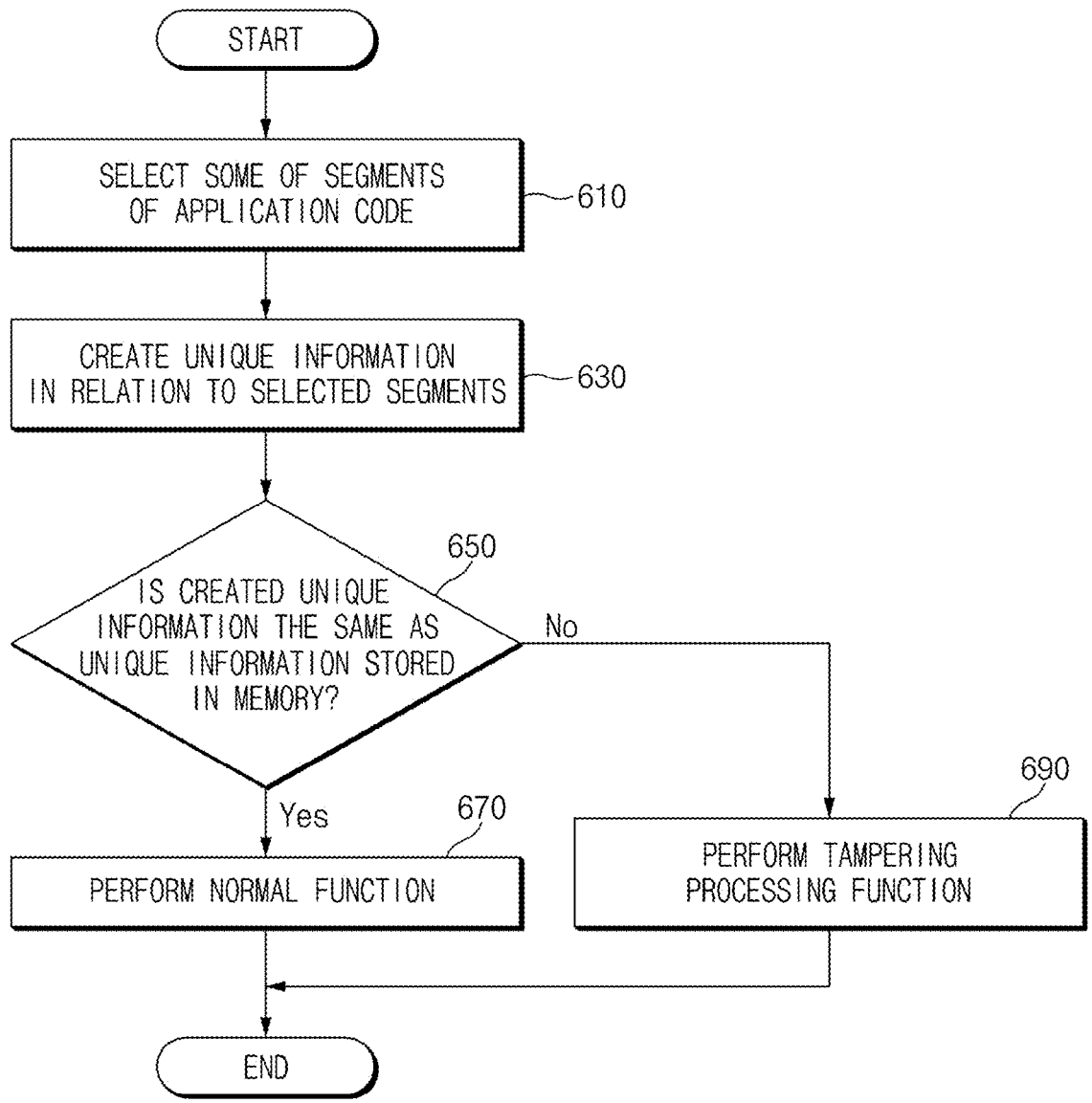
FIG. 6 is a diagram illustrating an operating method of an electronic device associated with detecting the tampering with application code, according to an embodiment of the present disclosure.

FIG. 6 is a diagram illustrating an operating method of an electronic device associated with detecting the tampering with application code, according to an embodiment of the present disclosure.

Referring to FIG. 6, in operation 610, an electronic device (e.g., the electronic device 101) may select some of segments (or pages) of code of an application (e.g., the application program 147). According to an embodiment, the electronic device may differently specify the number of segments (or pages) to be selected, based on an authentication ratio of the application. The authentication ratio of the application may be specified based on at least one of a security level of the application, performance of the electronic device, and a size of the whole code of the application.

In operation 630, the electronic device may create unique information in relation to the selected segments (or pages). The unique information may include, for example, at least one of a hash value of each segment (or page) extracted by using a hash function, a ciphertext of each segment (or page) extracted by using an encryption algorithm, and a calculation value of each segment (or page) extracted by using a bit operation.

According to various embodiments, the electronic device may also create unique information in relation to the whole code of the application. For example, the electronic device may create the final unique information in relation to the whole code of the application by using the unique information in relation to the selected segments (or pages) and unique information (e.g., the application-unique information 149) in relation to the remaining segments (or pages) stored in advance in a memory (e.g., the memory 130). For example, the electronic device may create final unique information in a way to create unique information corresponding to an upper node by using, as an input value, unique information corresponding to lower nodes adjacent on a binary tree in which each of the divided segments (or pages) is a leaf node.

In operation 650, the electronic device may determine whether the created unique information is the same as the unique information stored in advance in the memory. According to an embodiment, the electronic device may determine whether the created unique information is the same as the unique information stored in advance in the memory, by comparing the created unique information and the unique information stored in advance in the memory. According to another embodiment, the electronic device may determine whether the created final unique information is the same as the final unique information of the whole code of the application stored in advance in the memory, by comparing the created final unique information and the final unique information of the whole code of the application stored in advance in the memory. In any embodiment, the electronic device may replace operation 650 with an operation of verifying a digital signature value stored in advance in the memory based on the created final unique information.

According to various embodiments, if the created unique information is the same as the unique information stored in advance in the memory, in operation 670, the electronic device may determine that the code of the application is not tampered with and may perform a normal function. For example, the electronic device may execute the application.

Also, the electronic device may permit the application to write or read data in or from a secure world (e.g., the secure world 180).

According to various embodiments, if the created unique information is different from the unique information stored in advance in the memory, in operation 690, the electronic device may determine that the code of the application is tampered with and may perform a function of processing the tampering. For example, the electronic device may not execute the application. Alternatively, the electronic device may restrict the application so as not to write or read data in or from the secure world. In any embodiment, the electronic device may output a display object (e.g., a pop-up) indicating the tampering with the code of the application to a display (e.g., the display 160). Also, the electronic device may output voice information indicating the tampering with the code of the application, to a voice output device included in an input/output interface (e.g., the I/O interface 150).

As described above, according to various embodiments, a method for determining tampering of code of an application may include dividing the code of the application into a plurality of segments, selecting at least one first segment of the segments, creating first unique information in relation to the at least one first segment, creating second unique information in relation to the whole code of the application by using third unique information in relation to at least one second segment, which is different from the at least one first segment, from among the segments and the first unique information, wherein the third unique information is stored in a memory, verifying fourth unique information of an application stored in the memory based on the second unique information, and determining whether the code of the application is tampered with, based on the verification result.

According to various embodiments, the method may further include storing, in the memory, the fourth unique information of the application, which includes tamper-proof code created based on unique information in relation to the whole code of the application in a process of manufacturing the electronic device or upon installing the application.

According to various embodiments, the tamper-proof code may include at least one of a digital signature value and hash-based message authentication code (HMAC).

According to various embodiments, the dividing of the code of the application into the plurality of segments may include dividing the code of the application into the segments each having a specified size, specifying the number of the segments divided and divide the code of the application into the segments to correspond to the specified number, or randomly dividing the code of the application into the segments.

According to various embodiments, the selecting of the at least one first segment may include specifying the number of the at least one first segment selected based on at least one of a security level of the application, performance of the electronic device, and a size of the whole code of the application.

According to various embodiments, the selecting of the at least one first segment may include selecting a plurality of segments adjacent to each other on the code of the application as at least one group.

According to various embodiments, the selecting of the at least one first segment may include first selecting at least one segment, which corresponds to significant code, from among the segments as a part of the at least one first segment based on contents of the code of the application, and randomly selecting at least another segment, which is different from the at least one segment, from among the segments as another part of the at least one first segment.

According to various embodiments, each of the first unique information, the second unique information, and the third unique information may include at least one of a hash value extracted by using a hash function, a ciphertext extracted by using an encryption algorithm, and a calculation value extracted by using a bit operation.

Figure 7:
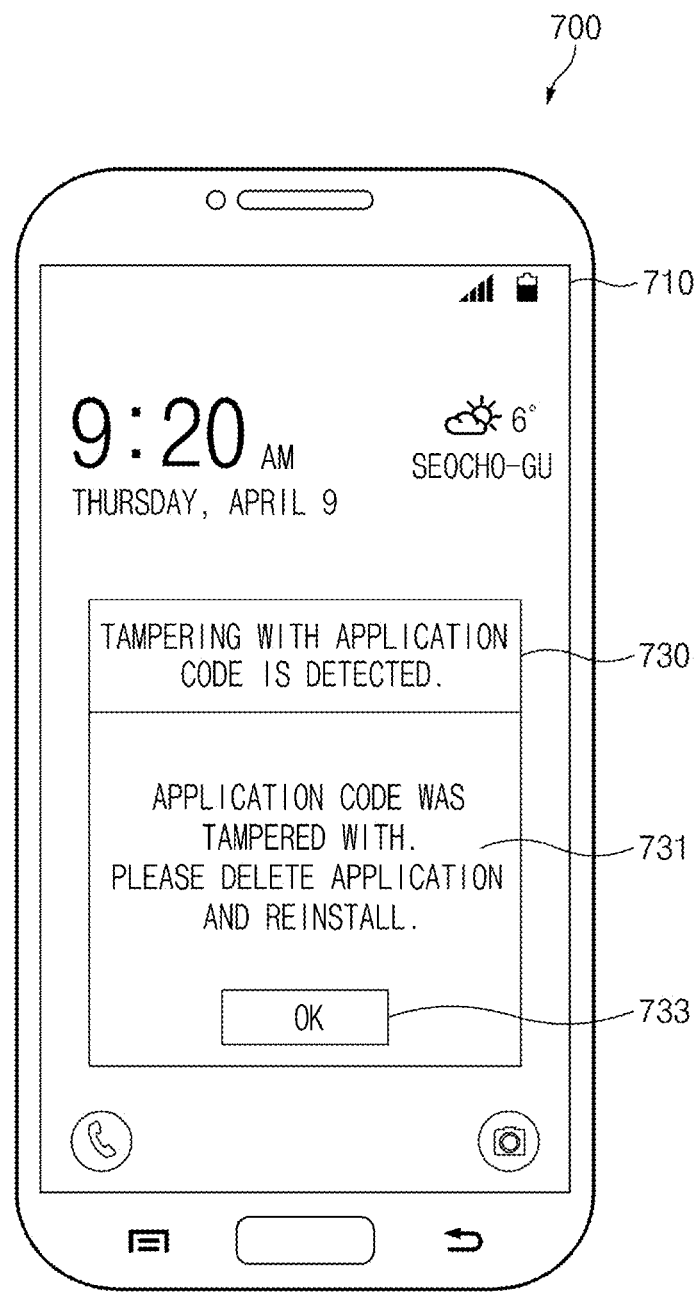
FIG. 7 is a diagram for describing how a user interface is provided based on the tampering with application code, according to an embodiment of the present disclosure.

FIG. 7 is a diagram for describing how a user interface is provided based on the tampering with application code, according to an embodiment of the present disclosure.

Referring to FIG. 7, according to various embodiments, in the case where code of an application (e.g., the application program 147) is tampered with, an electronic device 700 may provide a notification associated with the case through a user interface. Referring to FIG. 7, the electronic device 700 may output a display object 730 (e.g., a pop-up) indicating the tampering with the code of the application to the display 710.

According to an embodiment, the display object 730, appearing on a display 710 of the electronic device 700, may include a text object 731 indicating the tampering with the code of the application. As another example, the display object 730 may further include a button object 733 that is set to end an output of the display object 730. As such, if the button object 733 is selected, the electronic device 700 may end the output of the display object 730. Alternatively, if a specified time elapses after the display object 730 is output, the electronic device 700 may end the output of the display object 730.

According to embodiments disclosed in this specification, it may be possible to reduce a processing time and to prevent an increase in burden of a system resource involved in processing, by creating unique information of only some of segments of application code and detecting the tampering with the application code based on the created unique information.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 120), the processor may perform functions corresponding to the instructions. The computer-readable storage medium may be, for example, the memory 130.

A computer-readable recording medium may include a hard disk, a floppy disk, a magnetic medium (e.g., a magnetic tape), an optical medium (e.g., compact disc read only memory (CD-ROM), digital versatile disc (DVD)), a magneto-optical medium (e.g., a floptical disk), or a hardware device (e.g., a read only memory (ROM), a random-access memory (RAM), a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a memory configured to store an application and first unique information of the application; and
   at least one processor operatively connected with the memory,
   wherein the at least one processor is configured to:
      divide code of the application into a plurality of segments,
      select at least one segment among the plurality of segments,
      create second unique information in relation to the at least one segment based on at least one of a security level of the application, a performance of the electronic device, or a size of the code of the application,
      compare the first unique information and the second unique information, and
      determine whether the code of the application has been tampered with, based on a result of the comparison of the first unique information and the second unique information.

2. The electronic device of claim 1, wherein the first unique information includes unique information in relation to the at least one segment created in a process of manufacturing the electronic device or upon installing the application.

3. The electronic device of claim 1, wherein the first unique information includes at least one of: a hash value of the at least one segment extracted by using a hash function, a ciphertext of the at least one segment extracted by using an encryption algorithm, or a calculation value of the at least one segment extracted by using a bit operation.

4. The electronic device of claim 1, wherein the at least one processor is further configured to:
   divide the code of the application into the plurality of segments each having a specified size;
   specify the number of the plurality of segments divided and divide the code of the application into the segments to correspond to the specified number; or
   divide the code of the application into the plurality of segments randomly.

5. An electronic device comprising:
   a memory configured to store an application and first unique information of the application; and
   at least one processor operatively connected with the memory,
   wherein the at least one processor is configured to:
      divide code of the application into a plurality of segments,
      select at least one first segment among the plurality of segments based on at least one of a security level of the application, a performance of the electronic device, or a size of the code of the application,
      create second unique information in relation to the at least first one segment,
      create third unique information in relation to the code of the application by using fourth unique information in relation to at least one second segment, which is different from the at least one first segment, from among the plurality of segments and the second unique information,
      verify the first unique information based on the third unique information, and
      determine whether the code of the application is tampered with, based on the verification result, and
   wherein the fourth unique information is stored in the memory.

6. The electronic device of claim 5, wherein the first unique information includes tamper-proof code created based on fifth unique information in relation to the whole code of the application in a process of manufacturing the electronic device or upon installing the application.

7. The electronic device of claim 6, wherein the tamper-proof code includes at least one of a digital signature value or hash-based message authentication code (HMAC).

8. The electronic device of claim 5, wherein each of the second unique information, the third unique information, and the fourth unique information includes at least one of a hash value extracted by using a hash function, a ciphertext extracted by using an encryption algorithm, or a calculation value extracted by using a bit operation.

9. The electronic device of claim 5, wherein the at least one processor is further configured to:
   select a plurality of segments adjacent to each other on the code of the application as at least one group upon selecting the at least one first segment.

10. The electronic device of claim 5, wherein the at least one processor is further configured to:
    first select, based on contents of the code of the application, at least one segment which corresponds to a significant code, from among the plurality of segments as a part of the at least one first segment, and
    randomly select at least another segment, which is different from the at least one segment, from among the plurality of segments as another part of the at least one first segment.

11. A method for determining tampering of code of an application, the method comprising:
    dividing the code of the application into a plurality of segments;
    selecting at least one first segment among the plurality of segments based on at least one of a security level of the application, a performance of the electronic device, or a size of the code of the application;
    creating first unique information in relation to the at least one first segment;
    creating second unique information in relation to the code of the application by using third unique information in relation to at least one second segment, which is different from the at least one first segment, from among the segments and the first unique information, verifying fourth unique information of an application stored in the memory based on the second unique information; and determining whether the code of the application is tampered with, based on the verification result, wherein the third unique information is stored in a memory.

12. The method of claim 11, further comprising:

storing, in the memory, fourth unique information of the application, which includes tamper-proof code created based on fifth unique information in relation to the whole code of the application in a process of manufacturing the electronic device or upon installing the application.

13. The method of claim 12, wherein the tamper-proof code includes at least one of a digital signature value or hash-based message authentication code (HMAC).

14. The method of claim 11, wherein the dividing of the code of the application into the plurality of segments includes:

dividing the code of the application into the plurality of segments each having a specified size;

specifying the number of the plurality of segments that is divided and divide the code of the application into the segments to correspond to the specified number; or randomly dividing the code of the application into the segments.

15. The method of claim 11, wherein the selecting of the at least one first segment includes:

selecting a plurality of segments adjacent to each other on the code of the application as at least one group.

16. The method of claim 11, wherein the selecting of the at least one first segment includes:

first selecting at least one segment, which corresponds to significant code, from among the plurality of segments as a part of the at least one first segment based on contents of the code of the application; and randomly selecting at least another segment, which is different from the at least one segment, from among the plurality of segments as another part of the at least one first segment.

17. The method of claim 11, wherein each of the first unique information, the second unique information, and the third unique information includes at least one of a hash value extracted by using a hash function, a ciphertext extracted by using an encryption algorithm, or a calculation value extracted by using a bit operation.

* * * * *